United States Patent
Itoyama et al.

(10) Patent No.: US 10,910,915 B2
(45) Date of Patent: Feb. 2, 2021

(54) ROTARY ELECTRIC MACHINE SYSTEM AND VEHICLE

(71) Applicant: HONDA MOTOR CO., LTD., Tokyo (JP)

(72) Inventors: Ryosuke Itoyama, Wako (JP); Tomotaka Iki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/296,328

(22) Filed: Mar. 8, 2019

(65) Prior Publication Data
US 2019/0288581 A1    Sep. 19, 2019

(30) Foreign Application Priority Data

Mar. 15, 2018    (JP) .................................. 2018-048483

(51) Int. Cl.
*H02K 11/25*    (2016.01)
*H02K 11/30*    (2016.01)
(Continued)

(52) U.S. Cl.
CPC .............. *H02K 9/005* (2013.01); *B60K 6/26* (2013.01); *H02K 11/25* (2016.01); *H02K 11/30* (2016.01);
(Continued)

(58) Field of Classification Search
CPC ........ H02K 9/005; H02K 11/25; H02K 11/30; H02K 9/00; H02K 9/02; H02K 9/04;
(Continued)

(56) References Cited

U.S. PATENT DOCUMENTS

| 2009/0127960 A1* | 5/2009 | Kawamura | H02K 1/278 |
| | | | 310/156.43 |
| 2013/0342049 A1* | 12/2013 | Stridsberg | H02K 1/32 |
| | | | 310/58 |
| 2015/0033938 A1* | 2/2015 | Erlston | F01B 21/04 |
| | | | 91/55 |

FOREIGN PATENT DOCUMENTS

| CN | 105210275 | 12/2015 |
| CN | 107134887 | 9/2017 |

(Continued)

OTHER PUBLICATIONS

Chinese Office Action for Chinese Patent Application No. 201910183635.2 dated Aug. 28, 2020.

*Primary Examiner* — Quyen P Leung
*Assistant Examiner* — Alexander A Singh
(74) *Attorney, Agent, or Firm* — Amin, Turocy & Watson, LLP (57) ABSTRACT

A rotary electric machine system includes a rotary electric machine unit, a temperature adjustment unit, and a control unit. The rotary electric machine unit includes a rotary electric machine and a temperature detection unit. The rotary electric machine includes a stator core around which a coil is wound, and a rotor having a magnet. The temperature adjustment unit increases the temperature of the stator core. When a rotational speed of the rotary electric machine is in a predetermined high-speed rotation state, in a case in which the temperature detected by the temperature detection unit is less than a predetermined value, the control unit controls the temperature control unit to increase the temperature of the rotary electric machine.

2 Claims, 10 Drawing Sheets

(51) Int. Cl.
*B60K 6/26* (2007.10)
*H02K 9/00* (2006.01)

(52) U.S. Cl.
CPC ....... *B60Y 2200/92* (2013.01); *B60Y 2306/05* (2013.01); *B60Y 2400/60* (2013.01)

(58) Field of Classification Search
CPC .. H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 9/26; H02K 9/28; B60K 6/26; B60Y 2400/60; B60Y 2200/92; B60Y 2306/05
USPC ....... 310/68 B, 68 C, 52, 53, 54, 55, 57, 58, 310/59, 60 R, 62, 63, 64
See application file for complete search history.

(56) References Cited

FOREIGN PATENT DOCUMENTS

| | | |
|---|---|---|
| JP | 2008-263753 | 10/2008 |
| JP | 2016-203760 | 12/2016 |

* cited by examiner

ROTARY ELECTRIC MACHINE SYSTEM AND VEHICLE

CROSS-REFERENCE TO RELATED APPLICATION

Priority is claimed on Japanese Patent Application No. 2018-048483, filed on Mar. 15, 2018, the contents of which are incorporated herein by reference.

BACKGROUND

Field of the Invention

The present invention relates to a rotary electric machine system and a vehicle.

Background

As a rotary electric machine for driving a vehicle, in general, a magnet motor (in particular, an interior permanent magnet (IPM) in which a magnet is buried inside a rotor) is adopted because it is highly efficient. In the case of a hybrid vehicle (HEV) or a plug-in hybrid vehicle (PHEV), running with the engine is generally performed without driving the motor in consideration of energy management to efficiently use energy at the time of high-speed cruising. In this state, in the case of a vehicle in which the rotary electric machine is directly connected to a drive shaft, the rotary electric machine is brought into a state of having accompanying rotation, and a no-load loss (hereinafter referred to as a drag loss) occurs. In order to eliminate this loss, vehicles equipped with a clutch for disconnecting the rotary electric machine from the drive shaft are known. However, in the case of a vehicle not equipped with a clutch, it is necessary to travel in a state in which drag loss is permitted.

Drag loss is a loss occurring in the magnet motor. Drag loss is an unloaded iron loss caused mainly by the main magnetic flux acting on a stator core. Drag loss is affected by a hysteresis loss, an eddy current loss (an iron loss), a magnetic flux amount and a rotational speed.

Since the drag loss is a brake for the vehicle, zero torque control of setting the driving force for the rotary electric machine to 0 to compensate for the back torque may be performed. Despite the fact that the rotary electric machine is not working, the zero torque control brings about a state of producing a drag loss and an electricity loss.

In order to minimize this loss, it is desirable to use an efficient rotary electric machine in which drag loss can be reduced.

A rotary electric machine unit that efficiently cools a coil end and a stator core of a rotary electric machine depending on the degree of occurrence of a copper loss and an iron loss of the rotary electric machine which changes according to the operating state of the vehicle has been proposed. By cooling the coil end and the stator core, it is possible to minimize heat generated in the rotary electric machine due to the copper loss and the iron loss (see, for example, Japanese Unexamined Patent Application, First Publication No. 2008-263753).

It is known that the iron loss (an eddy current loss) occurring in the stator core of a rotary electric machine decreases with an increase in temperature of the stator core. For this reason, in the rotary electric machine unit of Japanese Unexamined Patent Application, First Publication No. 2008-263753, it is difficult to minimize the iron loss occurring in the stator core and to reduce the drag loss.

SUMMARY

As a method of reducing the drag loss of a rotary electric machine, countermeasures provided by changing or optimizing a magnetic circuit of the stator and rotor are known. Specifically, for example, it is conceivable to upgrade a steel sheet material used for the stator core, and reduce an amount of magnet provided in the rotor, or the like.

However, it is difficult to minimize the costs for a rotary electric machine unit when reducing the drag loss by upgrading the steel sheet material, reducing the amount of magnet or the like. Therefore, with this method, it is difficult to secure the performance of the rotary electric machine unit and to minimize costs.

An aspect of the present invention provides a rotary electric machine system and a vehicle in which a drag loss is able to be reduced and also costs are able to be minimized A rotary electric machine system according to an aspect of the present invention includes: a rotary electric machine unit including a rotary electric machine and a temperature detection unit associated with the rotary electric machine, the rotary electric machine including a stator core having a slot and on which a coil is wound, and a rotor having a magnet; a temperature adjustment unit configured to increase the temperature of the rotary electric machine; and a control unit configured to control the temperature adjustment unit, wherein, when a rotational speed of the rotary electric machine is in a predetermined high-speed rotation state, in a case in which the temperature detected by the temperature detection unit is less than a predetermined value, the control unit controls the temperature control unit such that the temperature of the rotary electric machine is increased.

According to the aforementioned configuration, when the rotary electric machine is in a predetermined high-speed rotation state, in a case in which the temperature detected by the temperature detection unit is less than a predetermined value, the temperature of the rotary electric machine (in particular, the stator core) is increased by the temperature adjustment unit. Therefore, it is possible to minimize the iron loss occurring in the stator core. In this manner, by utilizing the decrease in the iron loss (eddy current loss) occurring in the stator core in accordance with the temperature rise of the stator core, the drag loss of the rotary electric machine unit can be reduced. Therefore, the loss of the rotary electric machine can be improved, and the efficiency of the rotary electric machine can be improved.

Further, using a simple configuration that merely increases the temperature of the rotary electric machine (specifically, the stator core), the iron loss occurring in the stator core is prevented, and the drag loss of the rotary electric machine unit is reduced. Thereby, the cost of the rotary electric machine unit can be reduced.

In the rotary electric machine system described above, the temperature detection unit may include a thermistor attached to the coil of the stator core.

According to the above configuration, by adding the thermistor to the coil of the stator core as the temperature detection unit, it is possible to appropriately detect the temperature of the stator core. Thus, any increase in temperature in the stator core can be satisfactorily adjusted, and it is possible to minimize drag loss by satisfactorily minimizing the iron loss generated in the stator core.

In addition, by providing the thermistor in the coil of the stator core, as the temperature detection unit, the temperature detection unit can have a simple configuration. Thereby, the cost of the rotary electric machine unit can be reduced.

In the rotary electric machine system described above, the temperature adjustment unit may include a refrigerant cooling device using a refrigerant.

According to the above configuration, by including the refrigerant cooling device as the temperature adjustment unit, the amount of the cooling medium supplied from the refrigerant cooling device to the stator core is controlled, and the temperature rise of the stator core can be favorably adjusted. Thereby, the iron loss occurring in the stator core can be favorably prevented, and the drag loss can be reduced.

Further, by using the refrigerant cooling device as the temperature adjustment unit, the temperature adjustment unit can have a simple configuration. Thereby, the cost of the rotary electric machine unit can be reduced.

A vehicle according to another aspect of the present invention includes the rotary electric machine system described above, an internal combustion engine, and a drive shaft, wherein, in a state in which the rotary electric machine is rotated together when the vehicle is traveling at high speed, when a rotational speed of the rotary electric machine is in a predetermined high-speed rotation state, in a case in which the temperature detected by the temperature detection unit is less than a predetermined value, the control unit increases the temperature of the rotary electric machine, using the temperature adjustment unit.

According to the above configuration, for example, in a state in which the rotary electric machine is performing no-load motion at the time of lock-up traveling when the vehicle is traveling at high speed, the rotary electric machine is rotated together when the vehicle travels at high speed, and a drag loss occurs. Therefore, the temperature of the rotary electric machine (in particular, the stator core) is increased by the temperature adjustment unit. Therefore, iron loss occurring in the stator core can be prevented. In this way, by utilizing the decrease in the iron loss (eddy current loss) in association with the temperature rise of the stator core, the drag loss of the rotary electric machine unit can be reduced. Thus, in vehicles such as hybrid vehicles and plug-in hybrid vehicles of an engine accompanied rotation specification in which the clutch does not need to be detached, it is possible to reduce drag loss in the rotary electric machine unit. As a result, it is possible to ameliorate the loss of the rotary electric machine in the high rotation region of the internal combustion engine, and it is possible to improve the efficiency of the rotary electric machine.

Furthermore, by a simple configuration that merely increases the temperature of the rotary electric machine (the stator core), the iron loss occurring in the stator core is prevented, and the drag loss of the rotary electric machine unit is reduced.

Thereby, it is possible to reduce the cost of the rotary electric machine unit (that is, the vehicle).

According to the aspect of the present invention, when the rotary electric machine is in a predetermined high-speed rotation state, in a case in which the temperature detected by the temperature detection unit is less than a predetermined value, the temperature of the rotary electric machine is increased by the temperature adjustment unit. Thereby, the drag loss can be reduced and the cost can be further reduced.

DESCRIPTION OF THE EMBODIMENTS

Hereinafter, an embodiment will be described on the basis of drawings. In the embodiment, a hybrid vehicle 1 is exemplified as an example of a vehicle, and a rotary electric machine system 4 is exemplified as a drive unit of the hybrid vehicle 1, but the present invention is not limited thereto. For example, when a plug-in hybrid vehicle is applied as the vehicle, it is also possible to apply the rotary electric machine system 4 to such a plug-in hybrid vehicle.

First Embodiment

Figure 1:
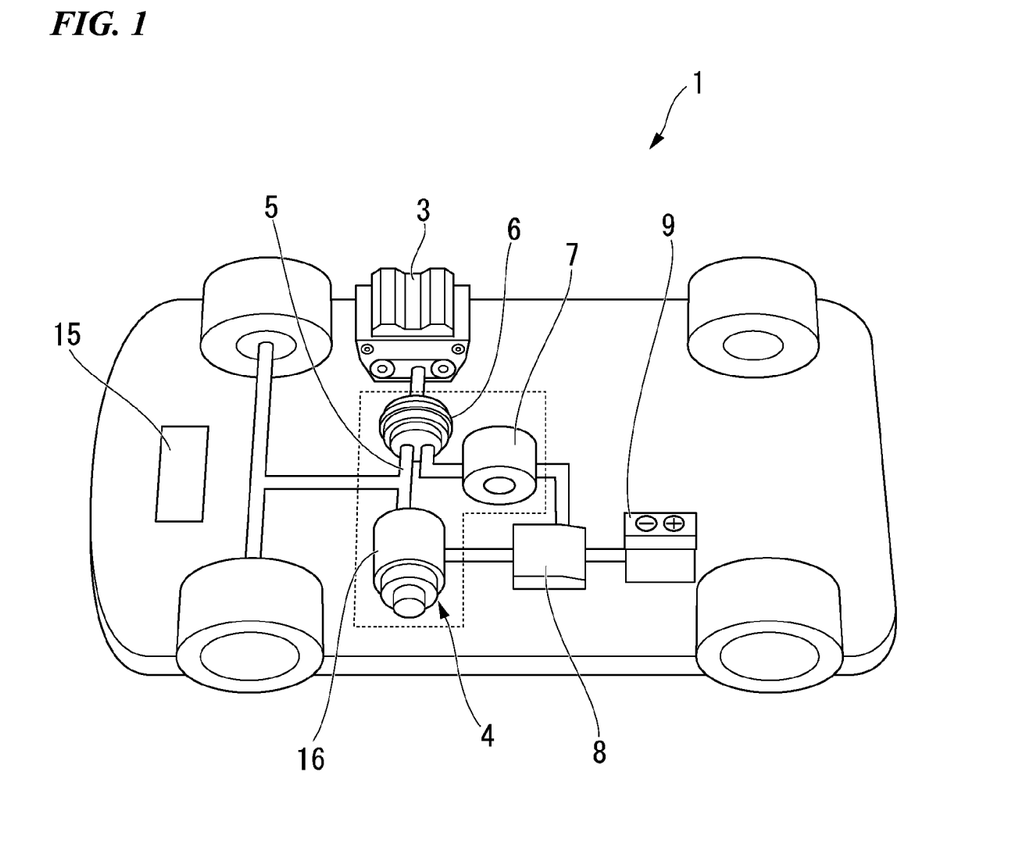
FIG. 1 is a schematic configuration diagram illustrating a hybrid vehicle equipped with a rotary electric machine system according to a first embodiment of the present invention.

As illustrated in FIG. 1, the hybrid vehicle 1 (vehicle) is a vehicle that is equipped with an internal combustion engine 3 and a rotary electric machine 16, and travels with a driving force of at least one of the internal combustion engine 3 and the rotary electric machine 16 depending on a traveling state. That is, the hybrid vehicle 1 is equipped with an internal combustion engine 3, a rotary electric machine system 4, a drive shaft (a foot shaft) 5, a power-dividing mechanism 6, a generator 7, an inverter 8, and a battery 9.

When the hybrid vehicle 1 travels, the internal combustion engine 3, the rotary electric machine 16, the generator 7, the inverter 8, and the like generate heat. For this reason, the hybrid vehicle 1 is equipped with a refrigerant cooling means 17 (see FIG. 5), for example, for cooling the rotary electric machine 16 and the generator 7.

Figure 2:
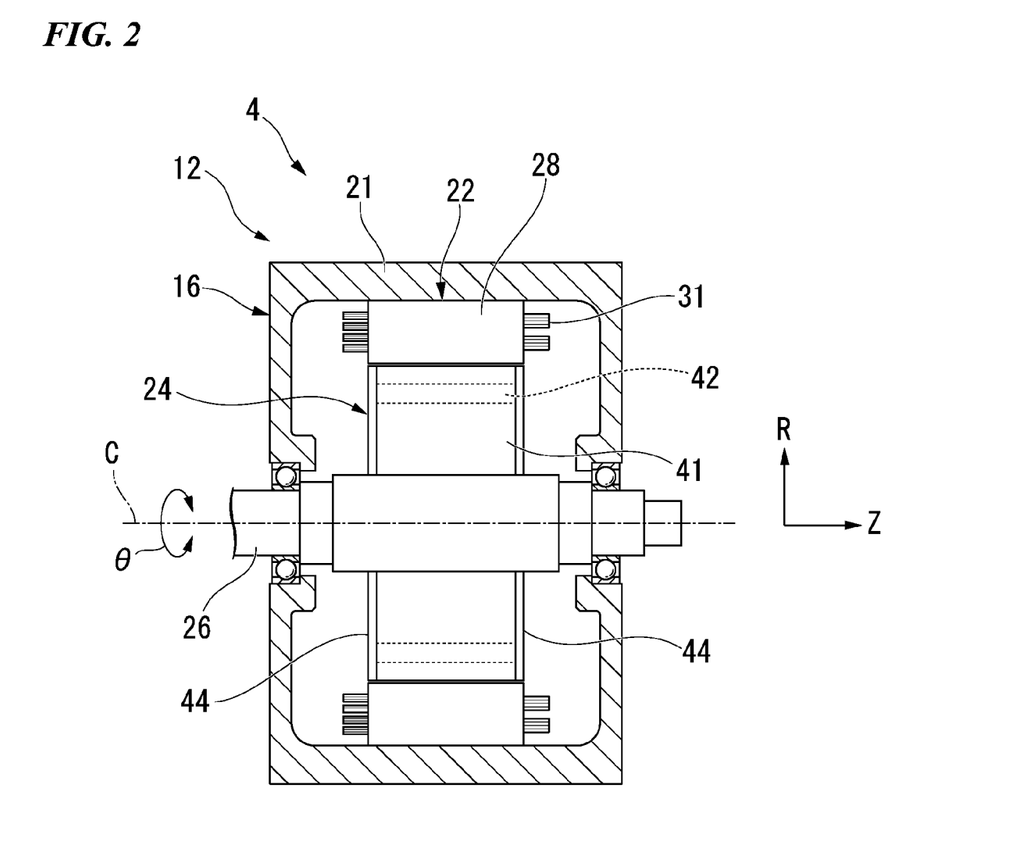
FIG. 2 is a cross-sectional view along an axis line of the rotary electric machine system according to the first embodiment.
Figure 3:
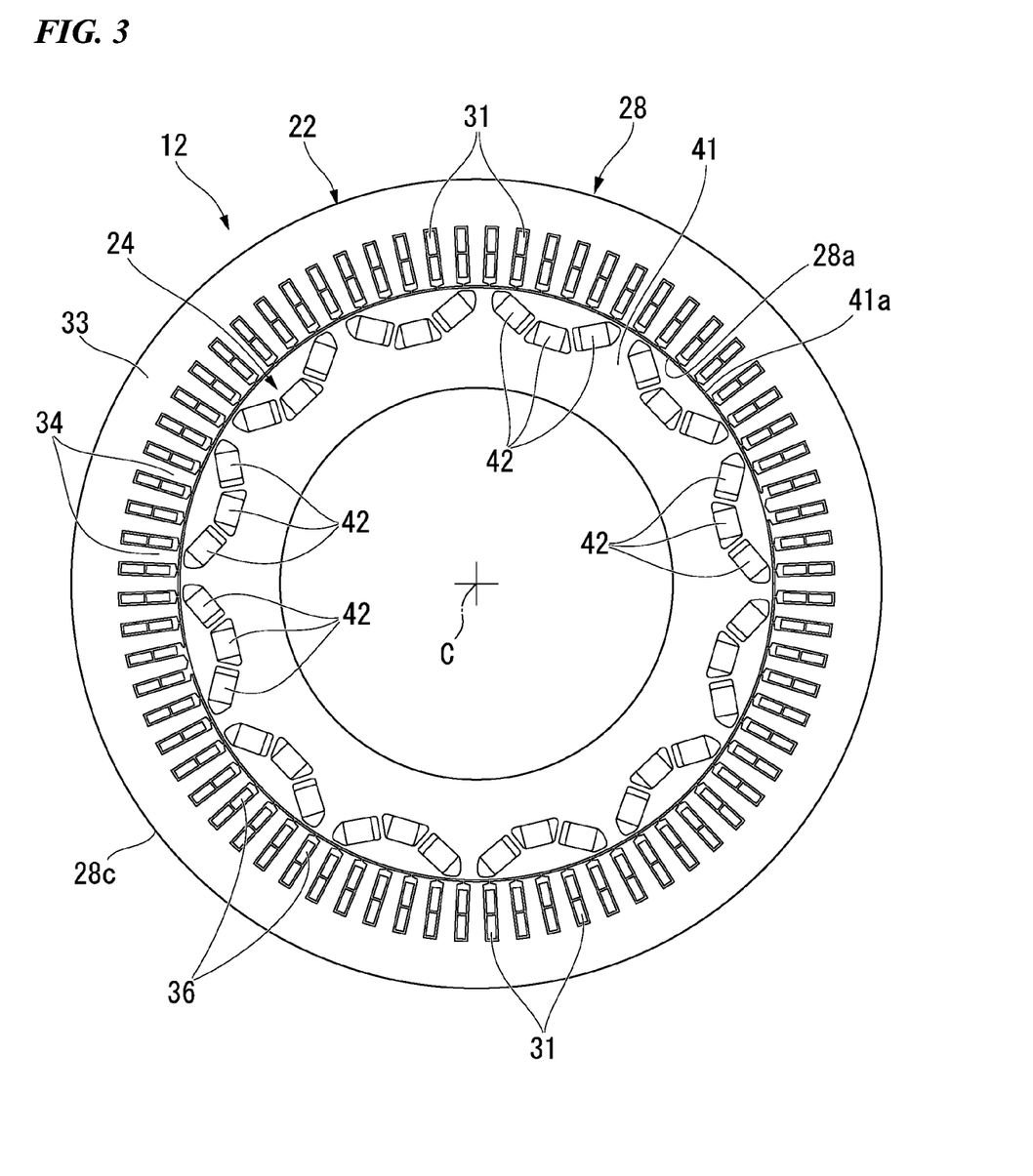
FIG. 3 is a cross-sectional view taken along a direction intersecting the axis line of the rotary electric machine system in the first embodiment.

As illustrated in FIGS. 2 and 3, the rotary electric machine system 4 includes a rotary electric machine unit 12, a temperature adjustment unit 14 (see FIGS. 5, 6A, and 6B), and a control unit 15 (see FIG. 1). The rotary electric machine unit 12 includes a rotary electric machine 16 and a temperature detection unit 18 (see FIG. 4).

The rotary electric machine 16 is a traveling motor mounted on the hybrid vehicle 1. The rotary electric machine 16 includes a housing 21, a stator 22, a rotor 24, and a shaft 26.

The housing 21 accommodates the stator 22 and the rotor 24, and supports the shaft 26 to be rotatable. The stator 22, the rotor 24, and the shaft 26 are disposed with an axis C as a common axis.

Hereinafter, a direction in which the axis C extends will be referred to as an axial direction, a direction orthogonal to the axis C will be referred to as a radial direction, and a direction circling around the axis C will be referred to as a circumferential direction. Further, in each drawing, an arrow Z indicates the axial direction, an arrow R indicates the radial direction, and an arrow 0 indicates the circumferential direction.

The stator 22 includes a stator core 28 and coils 31 of a plurality of layers (for example, a U phase, a V phase, and a W phase) mounted on the stator core 28.

The stator core 28 is formed in a tubular shape that surrounds the rotor 24 from an outer side in the radial direction.

The stator core 28 is formed by stacking annular plates formed by punching or the like on an electromagnetic steel plate in the axial direction (that is, in a stacking direction). The stator core 28 may be a so-called dust core.

Specifically, the stator core 28 has a back yoke 33 and a plurality of teeth 34. The back yoke 33 is formed in a tubular shape arranged coaxially with the axis C.

The plurality of teeth 34 are formed at predetermined intervals in the circumferential direction. The plurality of teeth 34 protrude radially inward from the inner circumferential surface of the back yoke 33.

Slots 36 are formed in a groove shape at predetermined intervals between adjacent teeth 34 in the circumferential direction. That is, the plurality of slots 36 are provided in the stator core 28 in a state of being alternately formed in the circumferential direction with respect to the plurality of teeth 34.

The coils 31 are arranged in the plurality of slots 36. The coils 31 are wound around the plurality of teeth 34. In this state, the coil 31 is attached to the stator core 28.

The stator 22 generates a magnetic field when a current flows through the coil 31.

The rotor 24 is disposed on a radially inner side of the stator 22. The rotor 24 includes a rotor core 41, a plurality of magnets 42 mounted (embedded) in the rotor core 41, and an end face plate 44 arranged in contact with both axial end faces of the rotor core 41. The rotor core 41 is formed into a cylindrical shape extending uniformly in the axial direction. An outer circumferential surface 41a of the rotor core 41 is disposed to face an inner circumferential surface 28a of the stator core 28. The rotor core 41 is formed, for example, by laminating a plurality of electromagnetic steel plates in the axial direction. A shaft 26 is inserted and fixed inside the rotor core 41, by press fitting or the like.

As a result, the rotor core 41 is rotatable around the axis C integrally with the shaft 26. The rotor 24 is rotationally driven by the repulsion or attraction of the magnetic field occurring in the stator 22 with the magnet 42.

Figure 4:
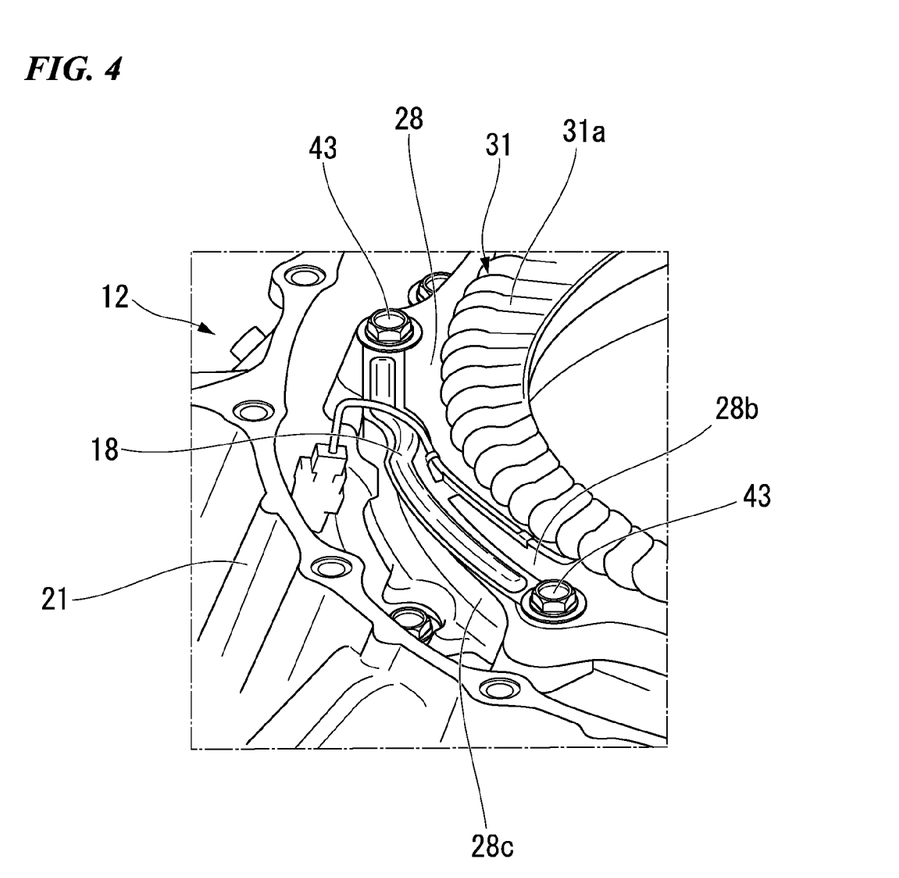
FIG. 4 is a perspective view illustrating a state in which a temperature detection unit is attached to the rotary electric machine in the first embodiment.

As illustrated in FIG. 4, for example, a thermistor is used as a temperature detection unit 18 in the rotary electric machine 16. The temperature detection unit 18 is provided with a pair of fastening members (bolts) 43, for example, on the stator core 28. Specifically, for example, the temperature detection unit 18 is provided to be adjacent to an outer circumferential surface 28c of the stator core 28 on the end face 28b of the stator core 28. Further, the temperature detection unit 18 is attached to the coil 31 (specifically, the coil end 31a) of the stator core 28.

In this manner, a thermistor is provided as the temperature detection unit 18 to be adjacent to the outer circumferential surface 28c of the stator core 28 on the end face 28b of the stator core 28. Therefore, the temperature of the stator core 28 can be properly detected by the temperature detection unit 18. A thermistor as the temperature detection unit 18 is attached to the coil 31. Therefore, the temperature (a winding temperature) of the coil 31 can be properly detected by the temperature detection unit 18.

Thus, it is possible to properly detect the temperature associated with the rotary electric machine 16 by the temperature detection unit 18. The temperature detected by the temperature detection unit 18 is transmitted to the control unit 15 (see FIG. 1).

Figure 5:
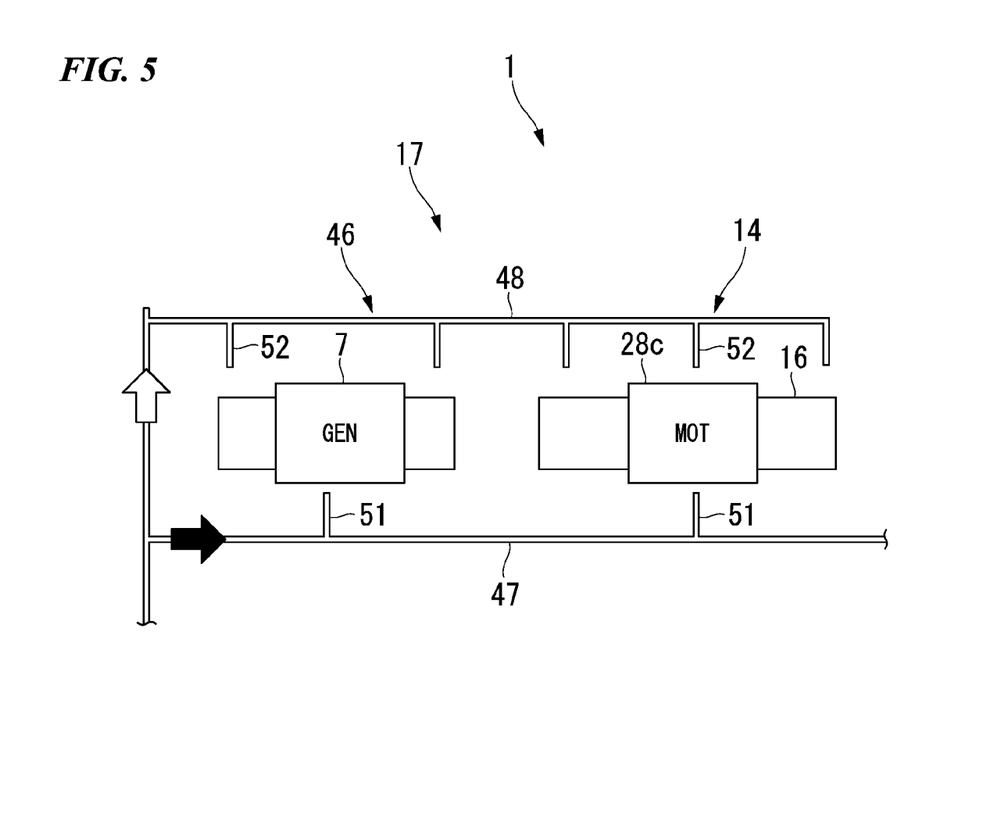
FIG. 5 is a schematic configuration diagram illustrating a refrigerant cooling means in the first embodiment.

As illustrated in FIG. 1 and FIG. 5, the hybrid vehicle 1 is provided with the refrigerant cooling means 17 (a refrigerant cooling device). The refrigerant cooling means 17 is configured to cool, for example, the internal combustion engine 3, the rotary electric machine 16, the generator 7, and the like with a cooling medium (automatic transmission fluid (ATF)). The refrigerant cooling means 17 includes a refrigerant circulation path 46 through which the cooling medium circulates.

The internal combustion engine 3, the rotary electric machine 16, and the generator 7 are similarly cooled, for example, by the cooling medium of the refrigerant cooling means 17. Therefore, the cooling of the rotary electric machine 16 will be described below, and a detailed description of the cooling of the internal combustion engine 3 and the power generator 7 will be omitted.

The refrigerant circulation path 46 communicates with a refrigerant supply pump. The refrigerant circulation path 46 includes a first circulation path 47 and a second circulation path 48. The first circulation path 47 is formed, for example, along an axial center of the shaft 26 (see FIG. 2) of the rotary electric machine 16 and a shaft (not illustrated) of the generator 7. A plurality of first nozzles 51 communicate with the first circulation path 47. The plurality of first nozzles 51 extend in a direction intersecting the first circulation path 47. Distal ends of the plurality of first nozzles 51 are opened.

The cooling medium guided to the first circulation path 47 is supplied from the distal ends of the plurality of first nozzles 51 to the shaft 26 side of the rotary electric machine 16. Therefore, the shaft 26, the bearing, and the magnet 42 (see FIG. 3) of the rotary electric machine 16 are cooled by the cooling medium.

The second circulation path 48 is formed, for example, along the outer circumferential surface side of the rotary electric machine 16 and the outer circumferential surface side of the generator 7. A plurality of second nozzles 52 communicate with the second circulation path 48. The plurality of second nozzles 52 extend in a direction intersecting the second circulation path 48. The distal ends of the plurality of second nozzles 52 open to the outer circumferential surface side of the rotary electric machine 16 and the outer circumferential surface side of the generator 7.

The cooling medium guided to the second circulation path 48 is supplied from the distal ends of the plurality of second nozzles 52 to the outer circumferential surface side of the rotary electric machine 16. Therefore, the outer circumferential surface 28c side of the rotary electric machine 16 (the stator core 28) is cooled by the cooling medium.

A temperature adjustment unit 14 (see FIGS. 6A and 6B) is provided in a part of the second circulation path 48 corresponding to the outer circumferential surface 28c of the stator core 28.

Figure 6A:
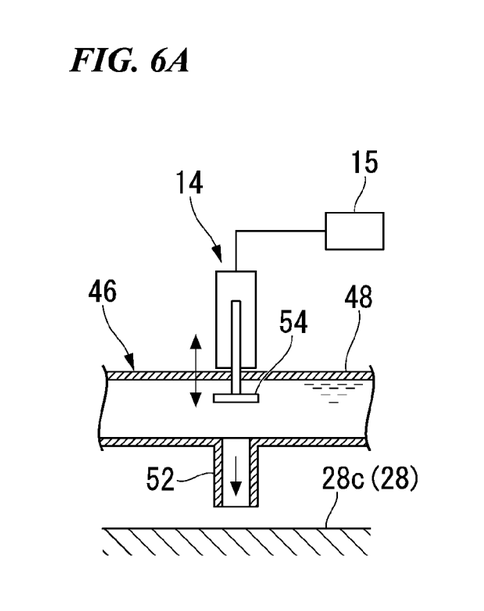
FIG. 6A is a cross-sectional view illustrating a state in which a temperature adjustment unit in the first embodiment is open.
Figure 6B:
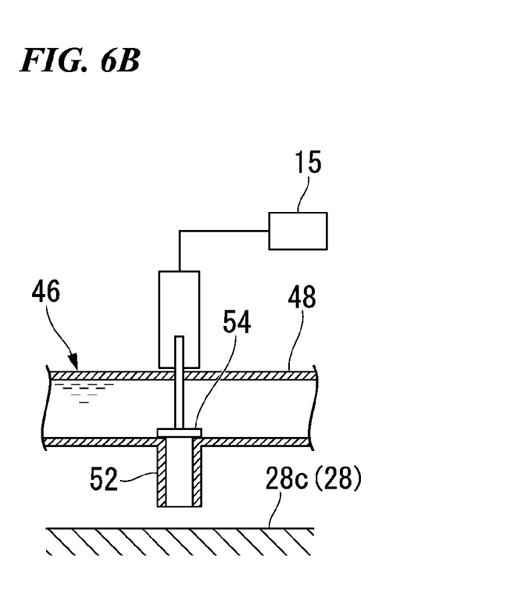
FIG. 6B is a cross-sectional view illustrating a state in which the temperature adjustment unit in the first embodiment is closed.

As illustrated in FIGS. 6A and 6B, the temperature adjustment unit 14 includes an on-off valve 54. The on-off valve 54 is disposed in the second circulation path 48.

The on-off valve 54 is supported to be freely movable in an arrow direction (that is, an opening and closing direction) intersecting the second circulation path 48. The on-off valve 54 is configured to be able to open and close the second nozzle 52 by being moved in the opening and closing direction. The second nozzle 52 is disposed at a position facing the outer circumferential surface 28c of the rotary electric machine 16 (the stator core 28).

As illustrated in FIG. 6A, the second nozzle 52 is opened by the on-off valve 54. Therefore, the cooling medium of the second circulation path 48 is supplied from the second nozzle 52 to the outer circumferential surface 28c side of the stator core 28. Therefore, the stator core 28 can be cooled by the cooling medium.

As illustrated in FIG. 6B, the second nozzle 52 is closed by the on-off valve 54.

Therefore, the cooling medium of the second circulation path 48 is prevented from being supplied from the second nozzle 52 to the outer circumferential surface 28c side of the stator core 28. As a result, the temperature of the stator core 28 can be increased by the temperature adjustment unit 14.

That is, the temperature adjustment unit 14 is configured to include a part of the refrigerant cooling means 17.

In other words, a part of the refrigerant cooling means 17 also serves as the temperature adjustment unit 14. According to the temperature adjustment unit 14, the temperature rise of the stator core 28 can be favorably adjusted by controlling an amount of the cooling medium supplied from the refrigerant cooling means 17 to the stator core 28.

It is known that the iron loss (eddy current loss) occurring in the stator core 28 of the rotary electric machine 16 decreases with the temperature rise of the stator core 28. Therefore, it is possible to favorably suppress the iron loss occurring in the stator core 28 and to reduce the drag loss. As a result, it is possible to improve the loss of the rotary electric machine 16 in a high rotation region of the internal combustion engine 3, and the efficiency of the rotary electric machine 16 can be improved.

Further, by using a part of the refrigerant cooling means 17 as the temperature adjustment unit 14, the temperature adjustment unit 14 can have a simple configuration.

As a result, the cost of the rotary electric machine system 4 (see FIG. 1) can be suppressed.

As illustrated in FIGS. 1, 6A, and 6B, the temperature adjustment unit 14 is controlled by the control unit 15. The detected temperature is transmitted from the temperature detection unit 18 (see FIG. 4) to the control unit 15.

The temperature of the stator core 28 and the temperature (the winding temperature) of the coil 31 are detected by the temperature detection unit 18.

The refrigerant temperature of the cooling medium is transmitted to the control unit 15. The refrigerant temperature of the cooling medium is directly measured by, for example, a thermistor.

A lock-up state of the hybrid vehicle 1 and the motor rotation speed of the rotary electric machine 16 are transmitted from an engine control unit (ECU). The ECU is, for example, a control means provided in the hybrid vehicle for controlling the operation of the internal combustion engine.

When the winding temperature and the refrigerant temperature are less than a predetermined value in a state in which the rotational speed of the rotary electric machine 16 rises from the low rotation to a predetermined high rotation, the control unit 15 controls the temperature adjustment unit 14 to increase the rotary electric machine 16 (specifically, the stator core 28).

Next, an example in which the drag loss caused by the accompanying rotation of the rotary electric machine 16 at the time of the lock-up traveling of the hybrid vehicle 1 is suppressed by the rotary electric machine system 4 will be described on the basis of FIGS. 5, 6A, 6B, 8 and 9, in addition to the flowchart of FIG. 7.

Figure 7:
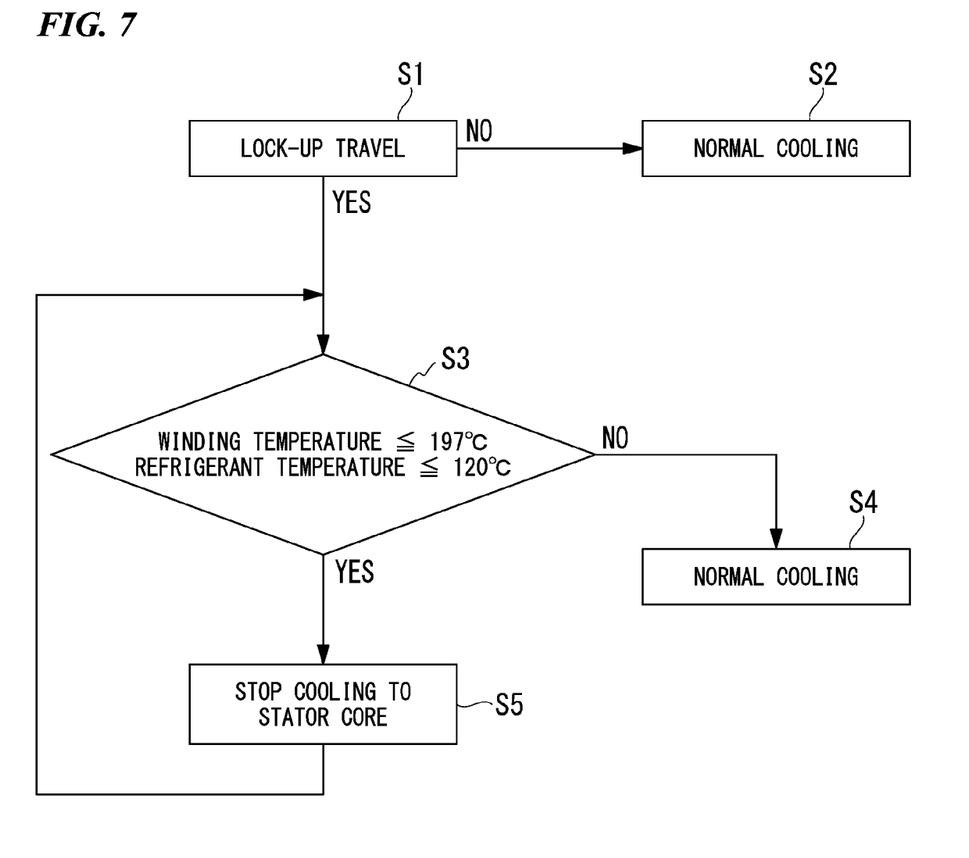
FIG. 7 is a flowchart illustrating an example in which the drag loss is reduced in an accompanying rotation state of the rotary electric machine when a hybrid vehicle in the first embodiment travels.

As illustrated in FIGS. 5 to 7, in step 51 of the hybrid vehicle 1, in a case in which the hybrid vehicle 1 does not perform the lock-up traveling when the rotational speed of the rotary electric machine 16 is in a predetermined high-speed rotation state at the time of high-speed traveling, normal cooling is performed in step S2. That is, in step S2, the second nozzle 52 is kept in an opened state by the on-off valve 54 of the temperature adjustment unit 14.

Therefore, the cooling medium of the second circulation path 48 is supplied from the second nozzle 52 to the outer circumferential surface 28c side of the stator core 28 of the rotary electric machine 16. As a result, the outer circumferential surface 28c of the stator core 28 is cooled by the cooling medium. That is, the stator core 28 is kept in the normal cooling state by the refrigerant cooling means 17.

On the other hand, in step 51, in the case of the lock-up traveling of the hybrid vehicle 1, an eddy current is generated by the accompanying rotation of the rotary electric machine 16. A relationship between eddy current and Joule heat occurring by eddy current will be described.

Figure 8:
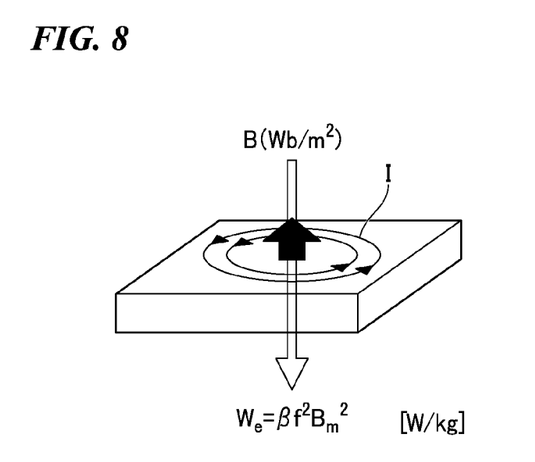
FIG. 8 is a view illustrating an eddy current occurring in the stator core of the rotary electric machine in the first embodiment.

As illustrated in FIG. 8, Joule heat We occurs in the stator core 28 due to generation of the eddy current I.

$$We = \beta f^2 B_m^2$$

here,

β: constant determined by a plate material of the iron core
F: frequency (Hz)
Bm: magnetic flux density (Wb/m$^2$)

Therefore, by increasing the temperature of the stator core 28 in advance, generation of the eddy current I can be suppressed. The relationship between the eddy current (iron loss) of the stator core 28 and the temperature will be described on the basis of FIG. 9.

Figure 9:
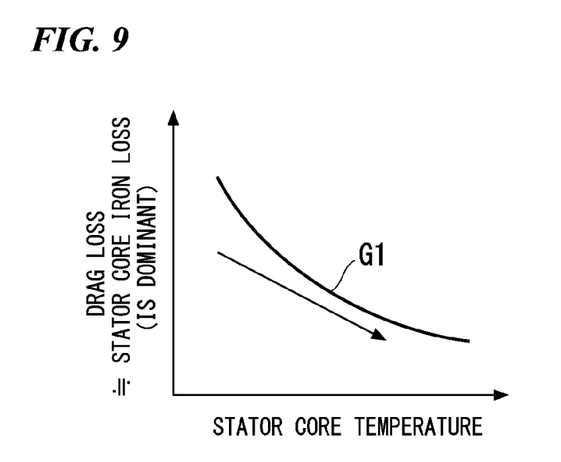
FIG. 9 is a graph illustrating a relationship between a temperature and an eddy current occurring in the stator core in the first embodiment.

FIG. 9 is a graph illustrating the relationship between eddy current (iron loss) occurring in the stator core 28 and the temperature. In FIG. 9, a vertical axis represents the iron loss of the stator core 28, and a horizontal axis represents the temperature of the stator core 28. A graph G1 illustrates the relationship between the iron loss and the temperature of the stator core 28.

The temperature of the stator core 28 rises and the iron loss of the stator core 28 decreases as illustrated by the graph G1 of FIG. 9.

Therefore, as illustrated in FIGS. 5 to 7, in the case of the lock-up traveling of the hybrid vehicle 1 in step S1, the process proceeds to step S3 to execute a control of increasing the temperature of the stator core 28 to suppress the iron loss of the stator core 28.

That is, in step S3, it is determined whether the winding temperature T1 of the rotary electric machine 16 satisfies the condition of T1≤197° C. and the refrigerant temperature T2 satisfies the condition of T2≤120° C. If the conditions are not satisfied, the normal cooling is executed in step S4.

The conditions of the winding temperature T1≤197° C. and the refrigerant temperature T2≤120° C. are set, for example, from the upper limit of the management temperature of the hybrid vehicle 1.

By executing the normal cooling in step S4, the second nozzle 52 is kept in an opened state by the on-off valve 54 of the temperature adjustment unit 14. Therefore, the cooling medium of the second circulation path 48 is supplied from the second nozzle 52 to the outer circumferential surface 28c side of the stator core 28. As a result, the outer circumferential surface 28c of the stator core 28 is cooled by the cooling medium. That is, the refrigerant cooling means 17 is kept in a normal cooling state.

On the other hand, in step S3, when the winding temperature T1 of the rotary electric machine 16 satisfies the condition of T1≤197° C. and the refrigerant temperature T2 satisfies the condition of T2≤120° C., step S5 is executed to increase the temperature of the stator core 28.

That is, in step S5, the second nozzle 52 is closed by the on-off valve 54 of the temperature adjustment unit 14. Therefore, the cooling medium of the second circulation path 48 is prevented from being supplied from the second nozzle 52 to the outer circumferential surface 28c side of the stator core 28. Therefore, the temperature of the stator core 28 of the rotary electric machine 16 can be increased.

As illustrated in FIG. 9, iron loss occurring in the stator core 28 can be suppressed by increasing the temperature of the stator core 28.

Therefore, when the temperature (that is, the winding temperature T1) detected by the temperature detection unit 18 and the refrigerant temperature T2 are less than the predetermined value in the predetermined high-speed rotation state of the rotary electric machine 16, the temperature of the stator core 28 of the rotary electric machine 16 is increased by the temperature adjustment unit 14. Therefore, the iron loss occurring in the stator core 28 can be suppressed.

In this manner, by utilizing the decrease in the iron loss (eddy current loss) occurring in the stator core 28 with the temperature rise of the stator core 28, it is possible to reduce the drag loss of the rotary electric machine system 4 in the hybrid vehicle 1. As a result, it is possible to improve the loss of the rotary electric machine 16 in the high rotation region of the internal combustion engine 3, and the efficiency of the rotary electric machine 16 can be improved.

Furthermore, by a simple configuration which merely increases the temperature of the stator core 28, the iron loss occurring in the stator core 28 is suppressed, and the drag loss of the rotary electric machine system 4 is reduced.

Therefore, the cost of the rotary electric machine system 4 (that is, the hybrid vehicle 1) can be suppressed.

Next, the temperature adjustment unit 60 of a first modified example will be described on the basis of FIGS. 10A and 10B. A temperature adjustment unit 70 according to a second modified example will be described on the basis of FIGS. 11A and 11B. In the temperature adjustment unit 60 of the first modified example and the temperature adjustment unit 70 of the second modified example, members the same as those of the temperature adjustment unit 14 of the first embodiment are denoted by the same reference numerals, and a detailed description thereof will be omitted.

FIRST MODIFIED EXAMPLE

Figure 10A:
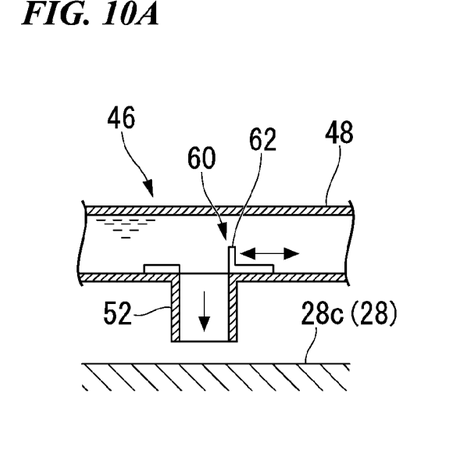
FIG. 10A is a cross-sectional view illustrating a state in which the temperature adjustment unit in a first modified example of the first embodiment is opened.
Figure 10B:
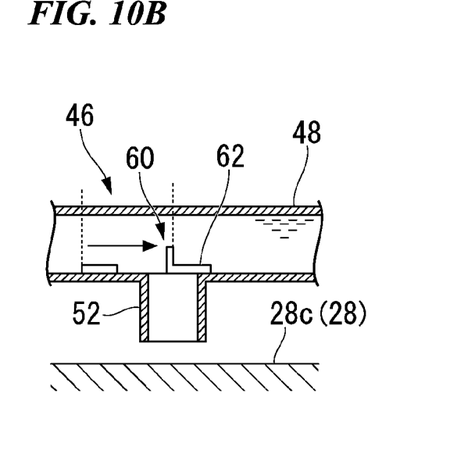
FIG. 10B is a cross-sectional view illustrating a state in which the temperature adjustment unit in the first modified example is closed.

As illustrated in FIGS. 10A and 10B, the temperature adjustment unit 60 is provided with an on-off valve 62 in place of the on-off valve 54 of the temperature adjustment unit 14 of the first embodiment, and other constituents are the same as those of the temperature adjustment unit 14 of the first embodiment.

The on-off valve 62 is disposed in the second circulation path 48. The on-off valve 62 is supported to be freely movable in a direction of an arrow (that is, the opening and closing direction) along the second circulation path 48. The on-off valve 62 is configured to be able to open and close the second nozzle 52 by being moved in the opening and closing direction.

As illustrated in FIG. 10A, the second nozzle 52 is opened by the on-off valve 62. Therefore, the cooling medium of the second circulation path 48 is supplied from the second nozzle 52 to the outer circumferential surface 28a side of the stator core 28 of the rotary electric machine 16. Therefore, the stator core 28 can be cooled by the cooling medium.

As illustrated in FIG. 10B, the opening state of the second nozzle 52 is adjusted by the on-off valve 62. Therefore, the cooling medium of the second circulation path 48 is prevented from being supplied from the second nozzle 52 to the outer circumferential surface 28c side of the stator core 28. As a result, the temperature of the stator core 28 can be increased by the temperature adjustment unit 60.

That is, similarly to the temperature adjustment unit 14 of the first embodiment, the temperature adjustment unit 60 is configured to include a part of the refrigerant cooling means 17. In other words, a part of the refrigerant cooling means 17 also serves as the temperature adjustment unit 60. According to the temperature adjustment unit 60, the temperature rise of the stator core 28 can be favorably adjusted by controlling the amount of the cooling medium supplied from the refrigerant cooling means 17 to the stator core 28. Therefore, it is possible to favorably suppress the iron loss occurring in the stator core 28 and to reduce the drag loss.

Further, by using a part of the refrigerant cooling means 17 as the temperature adjustment unit 60, the temperature adjustment unit 60 can have a simple configuration. Therefore, the cost of the rotary electric machine system 4 can be suppressed.

SECOND MODIFIED EXAMPLE

Figure 11A:
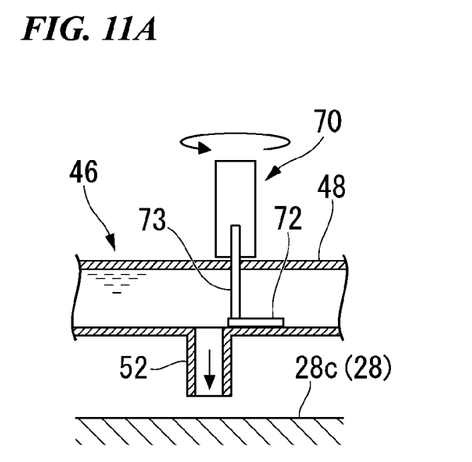
FIG. 11A is a cross-sectional view illustrating a state in which the temperature adjustment unit in a second modified example of the first embodiment is opened.
Figure 11B:
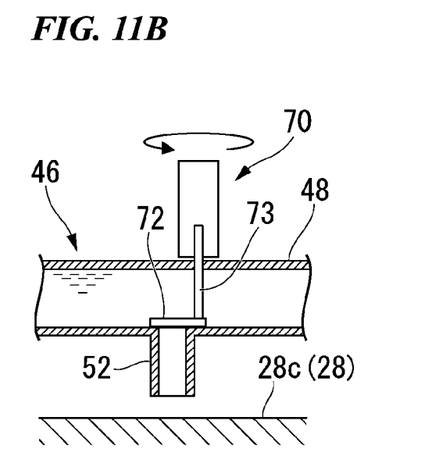
FIG. 11B is a cross-sectional view illustrating a state in which the temperature adjustment unit in the second modified example is closed.

As illustrated in FIGS. 11A and 11B, a temperature adjustment unit 70 is provided with an on-off valve 72 in place of the on-off valve 54 of the temperature adjustment unit 14 of the first embodiment, and other configurations are the same as those of the temperature adjustment unit 14 of the first embodiment.

The on-off valve 72 is disposed in the second circulation path 48. The on-off valve 72 is supported to be freely rotatable in the direction of the arrow (that is, the opening and closing direction) around the support shaft 73 as an axis. The on-off valve 72 is configured to be able to open and close the second nozzle 52 by being moved in the opening and closing direction.

As illustrated in FIG. 11A, the second nozzle 52 is opened by the on-off valve 72. Therefore, the cooling medium of the second circulation path 48 is supplied from the second nozzle 52 to the outer circumferential surface 28a side of the stator core 28 of the rotary electric machine 16. Therefore, the stator core 28 can be cooled by the cooling medium.

As illustrated in FIG. 11B, the opening state of the second nozzle 52 is adjusted by the on-off valve 72. Therefore, the cooling medium of the second circulation path 48 is suppressed from being supplied from the second nozzle 52 to the outer circumferential surface 28c side of the stator core 28. As a result, the temperature of the stator core 28 can be increased by the temperature adjustment unit 70.

That is, similarly to the temperature adjustment unit 14 of the first embodiment, the temperature adjustment unit 70 is configured to include a part of the refrigerant cooling means 17. In other words, a part of the refrigerant cooling means 17 also serves as the temperature adjustment unit 70. According to the temperature adjustment unit 70, the temperature rise of the stator core 28 can be favorably adjusted by controlling the amount of the cooling medium supplied from the refrigerant cooling means 17 to the stator core 28. Therefore, it is possible to favorably suppress the iron loss occurring in the stator core 28 and to reduce the drag loss.

In addition, by using a part of the refrigerant cooling means 17 as the temperature adjustment unit 70, the temperature adjustment unit 70 can have a simple configuration. Therefore, the cost of the rotary electric machine system 4 can be suppressed.

In the first embodiment, an example in which a drag loss occurs due to the accompanying rotation of the rotary electric machine 16 has been described on the basis of the hybrid vehicle 1 illustrated in FIG. 1, but the present invention can also be applied to other hybrid vehicles. Hereinafter, hybrid vehicles according to second to fifth embodiments to which the present invention is applicable will be described on the basis of FIGS. 12 to 15.

Second Embodiment

Figure 12:
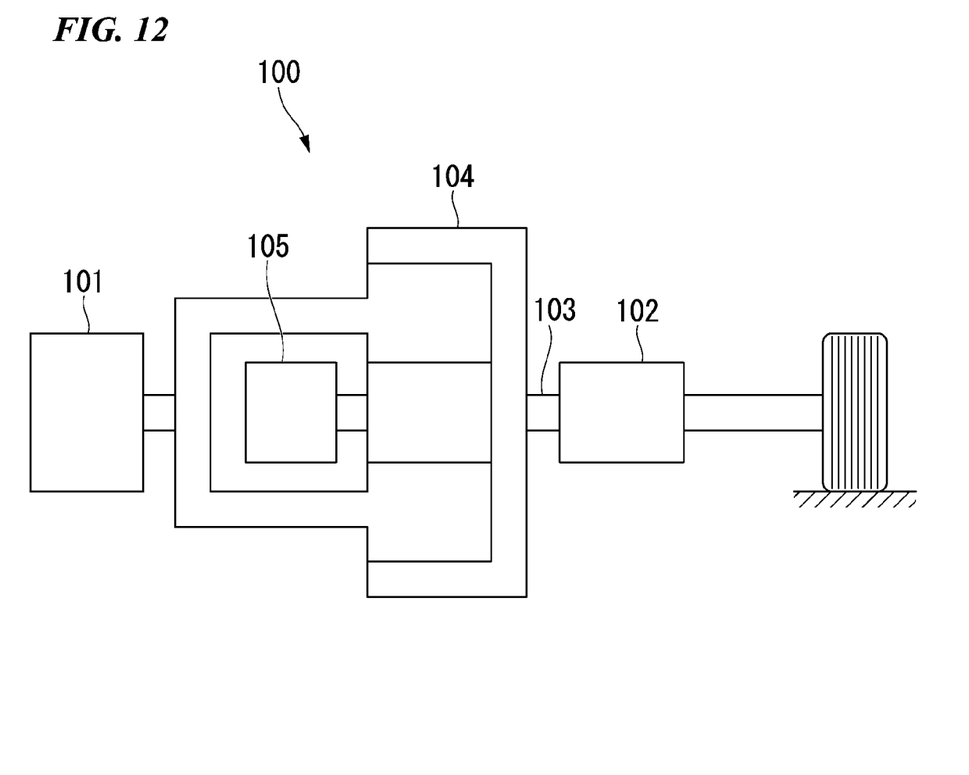
FIG. 12 is a schematic configuration diagram illustrating a hybrid vehicle equipped with a rotary electric machine system according to a second embodiment of the present invention.

As illustrated in FIG. 12, a hybrid vehicle 100 (vehicle) is equipped with an internal combustion engine 101, a rotary electric machine 102, a drive shaft (a foot shaft) 103, a transmission (a planetary gear) 104, and a generator 105. The hybrid vehicle 100 performs engine traveling without driving the motor to efficiently use energy, for example, at high-speed cruising. In this state, when the rotary electric machine 102 is directly connected to the drive shaft 103, the rotary electric machine 102 enters a state of being rotated together with the internal combustion engine 101, and a no-load loss (a drag loss) occurs in the rotary electric machine 102.

According to the hybrid vehicle 100, iron loss occurring in the stator core can be suppressed by increasing the temperature of the stator core of the rotary electric machine 102. In this manner, by utilizing the decrease in the iron loss (eddy current loss) occurring in the stator core with the temperature rise of the stator core, the drag loss of the rotary electric machine system can be reduced in the hybrid vehicle 100.

Furthermore, with a simple configuration that merely increases the temperature of the stator core, the iron loss occurring in the stator core is suppressed, and the drag loss of the rotary electric machine system is reduced. Therefore, the cost of the rotary electric machine system 4 (that is, the hybrid vehicle) can be suppressed.

Third Embodiment

Figure 13:
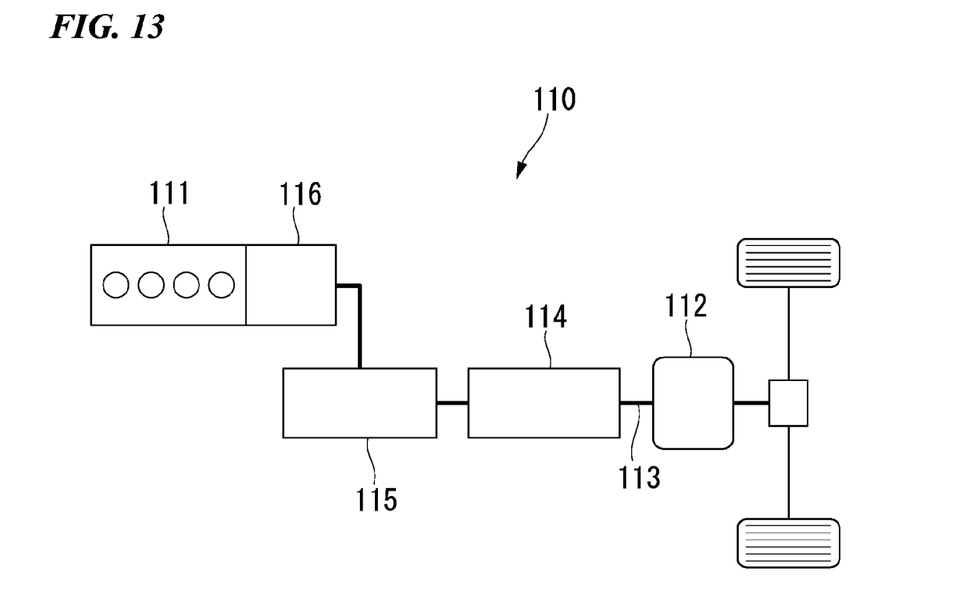
FIG. 13 is a schematic configuration diagram illustrating a hybrid vehicle equipped with a rotary electric machine system according to a third embodiment of the present invention.

As illustrated in FIG. 13, a hybrid vehicle 110 (vehicle) is equipped with an internal combustion engine 111, a rotary electric machine 112, a drive shaft (a foot shaft) 113, an inverter 114, a battery 115, and a generator 116. The hybrid vehicle 110 performs running of the engine without driving the motor such that energy is used efficiently, for example, during high-speed cruising. In this state, when the rotary electric machine 112 is directly connected to the drive shaft 113, the rotary electric machine 112 enters a state of being rotated together with the internal combustion engine 111, and a no-load loss (drag loss) occurs in the rotary electric machine 112.

According to the hybrid vehicle 110, iron loss occurring in the stator core can be suppressed by increasing the temperature of the stator core of the rotary electric machine 112. In this manner, by utilizing the decrease in the iron loss (eddy current loss) occurring in the stator core with the temperature rise of the stator core, the drag loss of the rotary electric machine system can be reduced in the hybrid vehicle 110.

Furthermore, with a simple configuration that merely increases the temperature of the stator core, the iron loss occurring in the stator core is suppressed, and the drag loss of the rotary electric machine system is reduced. As a result, the cost of the rotary electric machine system (that is, the hybrid vehicle) can be suppressed.

Fourth Embodiment

Figure 14:
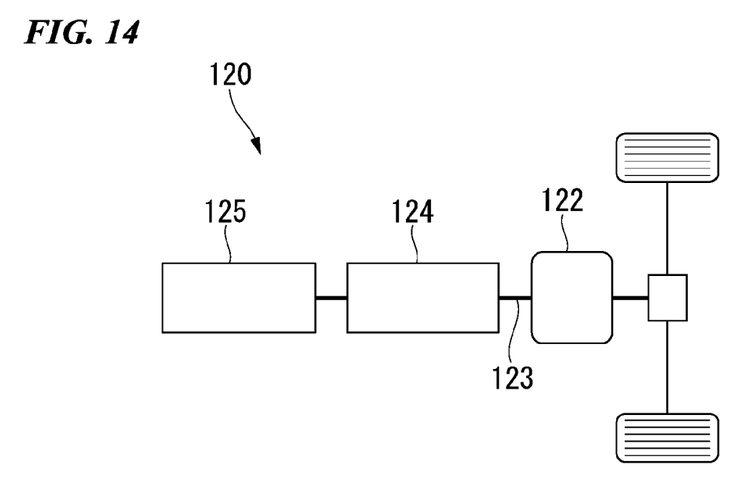
FIG. 14 is a schematic configuration diagram illustrating a vehicle equipped with a rotary electric machine system according to a fourth embodiment of the present invention.

As illustrated in FIG. 14, a hybrid vehicle 120 (vehicle) is equipped with a rotary electric machine 122, a drive shaft (a foot shaft) 123, an inverter 124, and a battery 125. For example, in a state in which an amount of charge in the battery 125 has reached an upper limit, when the hybrid vehicle 120 is performing traveling downhill, the rotary electric machine 122 enters an idle traveling state (an accompanying rotation state) without performing regeneration.

In this state, a no-load loss (drag loss) occurs in the rotary electric machine 122.

According to the hybrid vehicle 120, iron loss occurring in the stator core can be suppressed by increasing the temperature of the stator core of the rotary electric machine 122. In this way, by utilizing the decrease in the iron loss (the eddy current loss) occurring in the stator core with the temperature rise of the stator core, the drag loss of the rotary electric machine system can be reduced in the hybrid vehicle 120.

Furthermore, with a simple configuration that merely increases the temperature of the stator core, the iron loss occurring in the stator core is suppressed, and the drag loss of the rotary electric machine system is reduced. As a result, the cost of the rotary electric machine system (that is, the hybrid vehicle) can be suppressed.

Fifth Embodiment

Figure 15:
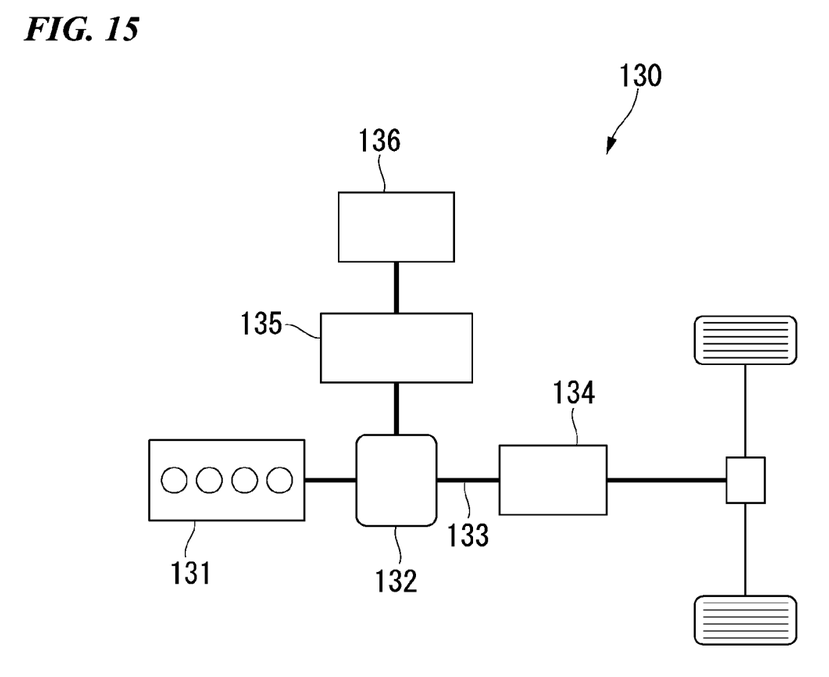
FIG. 15 is a schematic configuration diagram illustrating a hybrid vehicle equipped with a rotary electric machine system according to a fifth embodiment of the present invention.

As illustrated in FIG. 15, a hybrid vehicle 130 (vehicle) is equipped with an internal combustion engine 131, a rotary electric machine 132, a drive shaft (a foot shaft) 133, a transmission 134, an inverter 135, and a battery 136. The hybrid vehicle 130 performs engine traveling without driving the motor to efficiently use energy, for example, at high-speed cruising. In this state, when the rotary electric machine 132 is directly connected to the drive shaft 133, the rotary electric machine 132 enters a state of being rotated together with the internal combustion engine 131, and a no-load loss (drag loss) occurs in the rotary electric machine 132.

According to the hybrid vehicle 130, iron loss occurring in the stator core can be suppressed by increasing the temperature of the stator core of the rotary electric machine 132. In this manner, by utilizing the decrease in the iron loss (eddy current loss) occurring in the stator core with the temperature rise of the stator core, the drag loss of the rotary electric machine system can be reduced in the hybrid vehicle 130.

Furthermore, with a simple configuration that merely increases the temperature of the stator core, the iron loss occurring in the stator core is suppressed, and the drag loss of the rotary electric machine system is reduced. As a result, the cost of the rotary electric machine system (that is, the hybrid vehicle) can be suppressed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A hybrid vehicle, comprising:
   a rotary electric machine unit comprising a rotary electric machine and a temperature detection unit associated with the rotary electric machine, the rotary electric machine comprising a stator core having a slot and on which a coil is wound, and a rotor having a magnet;
   a temperature adjustment unit configured to increase a temperature of the rotary electric machine, the temperature adjustment unit being provided in one of a first circulation path and a second circulation path of a refrigerant circulation path, the first circulation path being along an axial center of the rotary electric machine, the second circulation path being along an outer circumferential surface of the rotary electric machine;
   a control unit configured to control the temperature adjustment unit,
   an internal combustion engine; and
   a drive shaft,
   wherein, in a state in which the rotary electric machine is rotated together with the drive shaft when the vehicle travels at high speed, the control unit controls an on-off valve provided in the temperature adjustment unit to increase the temperature of the rotary electric machine by suppressing the supply of refrigerant to the rotary electric machine based on a detection result that a temperature detected by the temperature detection unit is less than a predetermined value and that the refrigerant temperature circulating in the refrigerant circulation path is less than a predetermined value and that the hybrid vehicle is in a locked-up state.

2. The hybrid vehicle according to claim 1, wherein the temperature detection unit includes a thermistor attached to the coil of the stator core.

* * * * *